(12) United States Patent
Chen et al.

(10) Patent No.: US 7,298,484 B2
(45) Date of Patent: Nov. 20, 2007

(54) DUAL-BAND SENSOR SYSTEM UTILIZING A WAVELENGTH-SELECTIVE BEAMSPLITTER

(75) Inventors: Chungte W. Chen, Irvine, CA (US); Cheng-Chih Tsai, Cerritos, CA (US); John S. Anderson, Santa Monica, CA (US)

(73) Assignee: Raytheon Company, Waltham, MA (US)

( * ) Notice: Subject to any disclaimer, the term of this patent is extended or adjusted under 35 U.S.C. 154(b) by 244 days.

(21) Appl. No.: 11/053,298

(22) Filed: Feb. 7, 2005

(65) Prior Publication Data
US 2005/0200847 A1 Sep. 15, 2005

Related U.S. Application Data

(60) Provisional application No. 60/551,737, filed on Mar. 10, 2004.

(51) Int. Cl.
*G01N 21/25* (2006.01)
*G01J 3/46* (2006.01)

(52) U.S. Cl. .................... 356/416; 356/402
(58) Field of Classification Search ............ 356/416, 356/400; 353/75
See application file for complete search history.

(56) References Cited

U.S. PATENT DOCUMENTS

| 4,734,756 | A |   | 3/1988  | Butterfield et al. |
| 5,739,955 | A | * | 4/1998  | Marshall ............ 359/631 |
| 5,841,574 | A | * | 11/1998 | Willey ............... 359/351 |
| 5,880,771 | A |   | 3/1999  | Sutton et al. |
| 5,900,942 | A | * | 5/1999  | Spiering ............ 356/400 |
| 6,211,955 | B1 | * | 4/2001 | Basiji et al. ......... 356/326 |
| 2002/0122192 | A1 | * | 9/2002  | Ott .................... 358/1.9 |
| 2002/0176054 | A1 | * | 11/2002 | Mihalakis ........... 353/31 |

FOREIGN PATENT DOCUMENTS

| GB | 2 235 849 | 3/1991 |
| WO | WO 98/35262 | 8/1998 |

OTHER PUBLICATIONS

Smith, P.H.: "Imager for Mars Pathfinder Experiment (IMP): A Multispectral Stereo Imaging System" Proceedings of the SPIE, SPIE, Bellingham, VA, US, vol. 3295, Jan. 26, 1998, pp. 4-9, XP008022131 ISSN: 0277-786X, Fig. 2.

* cited by examiner

*Primary Examiner*—Tarifur Chowdhury
*Assistant Examiner*—Tara S Pajoohi
(74) *Attorney, Agent, or Firm*—Leonard A. Alkov

(57) ABSTRACT

An imaging sensor system images in two different spectral bands a light beam traveling on a light path from a target. The sensor system includes an imaging sensor operable to image light of the two different spectral bands, a common optics having at least one reflective or refractive optical element, and a wavelength-selective beamsplitter on the light path between the target and the imaging sensor. The wavelength-selective beamsplitter splits the light beam into two subbeams, one subbeam for each of the two different spectral bands, that are respectively incident upon two different locations of the imaging sensor. The imaging sensor may be used to detect buried explosive mines.

20 Claims, 2 Drawing Sheets

DUAL-BAND SENSOR SYSTEM UTILIZING A WAVELENGTH-SELECTIVE BEAMSPLITTER

This application claims the benefit of U.S. Provisional Application No. 60/551,737, filed Mar. 10, 2004, the disclosure of which is hereby incorporated herein by reference.

This invention relates to an imaging sensor system and, more particularly, to an imaging sensor system that images in two or more spectral bands.

BACKGROUND OF THE INVENTION

An imaging sensor system forms an image of a target on an imaging sensor. The imaging sensor converts the incident light image to electrical or optical signals for further processing such as pattern recognition functions. The imaging sensor system is distinct from a non-imaging sensor system, which reacts to the presence of the target but does not form an image of the target.

One potential application of imaging sensor systems is the detection of buried anti-personnel or anti-vehicle explosive mines. Such explosive mines, if undetected, may pose a hazard long after an area is otherwise thought to be safe for use. Once detected, such explosive mines may be neutralized or avoided, in the course of preparing the mined area for subsequent use.

The buried explosive mines may be detected based upon the spectral differences in the thermal emissivities of disturbed and undisturbed soils. One technique based upon this principle is to image the area being searched in two infrared wavelengths. The images are mathematically processed using appropriate algorithms to establish the presence of disturbed soil, which in turn suggests the possible presence of a buried explosive mine.

One approach to performing this explosive-mine detection based upon thermal emissivity differences requires the optical alignment of multiple sets of optics and the calibration of the imaging sensors. Such alignment and calibration are difficult to perform initially, and it is difficult to keep the multiple sets of optics aligned and calibrated during service. Further, the available apparatus is bulky and expensive.

There is a need for an improved approach to the detection of buried explosive mines using the differences in the emissivities of disturbed and undisturbed soils, and for other applications that image light in two different spectral bands. The present invention fulfills this need, and further provides related advantages.

SUMMARY OF THE INVENTION

The present invention provides an imaging sensor system that simultaneously images in two different spectral bands a light beam traveling on a light path from a target. Only a single common optics and a single common imaging sensor are required for imaging the two different spectral bands. The use of common optics and a common imaging sensor avoids the need to align the optics and maintain the optics in alignment, and the need to calibrate and maintain the relative calibration of two different imaging sensors. The imaging sensor system is also compact and light in weight. The imaging sensor system may be extended to more than two different spectral bands by extensions of the present approach, the use of filters, and the like. In an application of interest, the detection of buried explosive mines, the reduced size and weight, and the reduced requirements for alignment and calibration are important advantages because the application requires that the apparatus be used in a rugged environment by relatively unskilled personnel.

In accordance with the invention, an imaging sensor system images in two different spectral bands a light beam traveling on a light path from a target. (As used here, a "spectral band" may refer to a single discrete wavelength or to a range of wavelengths.) The sensor system comprises an imaging sensor operable to image light of the two different spectral bands, and a common optics having at least one reflective or refractive optical element. That is, the light beam of each of the two different spectral bands from the target reaching the imaging sensor encounters each optical element of the common optics. A wavelength-selective beamsplitter lies on the light path between the target and the imaging sensor. The wavelength-selective beamsplitter splits the light beam into two subbeams, one subbeam for each of the two different spectral bands, that are respectively incident upon two different locations of the imaging sensor.

The imaging sensor is preferably a single common imaging sensor that images the light of the two different spectral bands. Two different imaging sensors may be used, but this embodiment is less desirable because it increases the difficulties in calibrating the two imaging sensors and maintaining that calibration during service.

The wavelength-selective beamsplitter preferably comprises a dichroic reflector having a mirror and a wavelength-selective dichroic element. The mirror is desirably a planar mirror having a mirror plane, and the wavelength-selective dichroic element is preferably a planar wavelength-selective dichroic reflector having a dichroic plane. In this embodiment, the mirror plane is not parallel to the dichroic plane. In operation, the wavelength-selective dichroic element reflects a first wavelength to a first location on the imaging sensor and passes the second wavelength to the mirror. The mirror reflects the second wavelength to a second location on the imaging sensor.

The common optics and the wavelength-selective beamsplitter may be positioned in any operable relation. In the preferred embodiment, the wavelength-selective beamsplitter lies on the light path between the target and the common optics. There is also preferably a sensor window positioned such that the light path passes through the sensor window before it encounters the wavelength-selective beamsplitter, the common optics, and the imaging sensor.

One of the problems that can occur in some imaging sensor systems is that stray light may enter the sensor system to cause ghost images. To avoid such ghost images, there may be an external light baffle positioned such that the light path encounters the light baffle before it passes through the sensor window. An internal baffle may be used instead of or in addition to the external baffle. Spectral filters that individually pass only the spectral bands of interest to the imaging sensor may also be employed. The spectral filters block any stray light that is not of the respective spectral bands of interest.

There is typically provided a mount that supports the imaging sensor, the common optics, and the wavelength-selective beamsplitter, as well as any other components such as the light baffle(s) and the spectral filters. The application of most current interest is the use of the imaging sensor system to detect buried explosive mines based upon the thermal emissivity differences of disturbed and undisturbed soils. For that application, the mount supports the imaging sensor, the common optics, and the wavelength-selective beamsplitter, as well as any other components, in an orientation so that the target is on or in the ground.

A method for detecting buried explosive mines comprises the steps of providing an imaging sensor system as described above, aiming the imaging sensor system toward the ground such that the target is on or in the ground, and analyzing images produced by the two subbeams on the imaging sensor.

The present approach provides an imaging sensor system that images the target in two different spectral bands for subsequent analysis. By using a wavelength-selective beamsplitter, common optics and a common imaging sensor may be used. The use of the common optics avoids the alignment problems associated with separate optics for each spectral band. The use of the common imaging sensor avoids the calibration problems associated with separate sensors for each spectral band. The present approach also allows a significant reduction in the size and weight of the two-spectral-band imaging sensor system.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
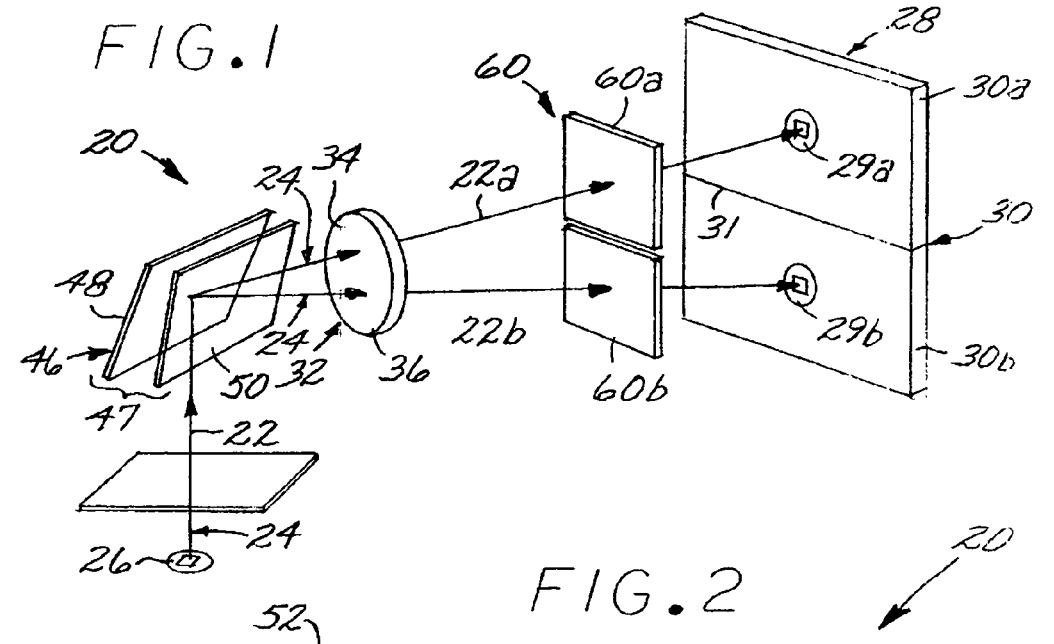
FIG. 1 is a schematic depiction of an imaging sensor system.
Figure 2:
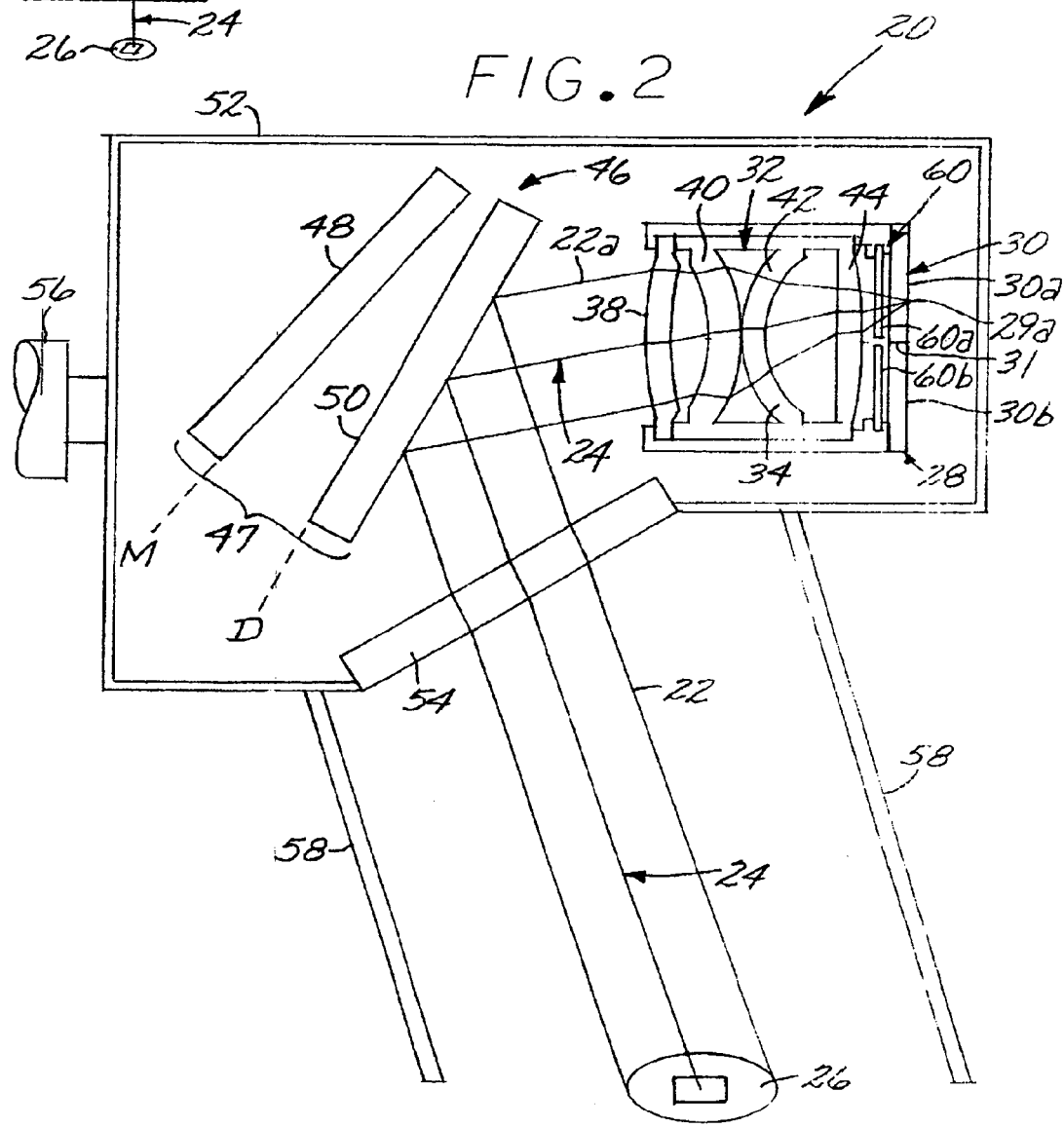
FIG. 2 is a schematic ray path drawing of the imaging sensor system for a first spectral band of the light beam.
Figure 3:
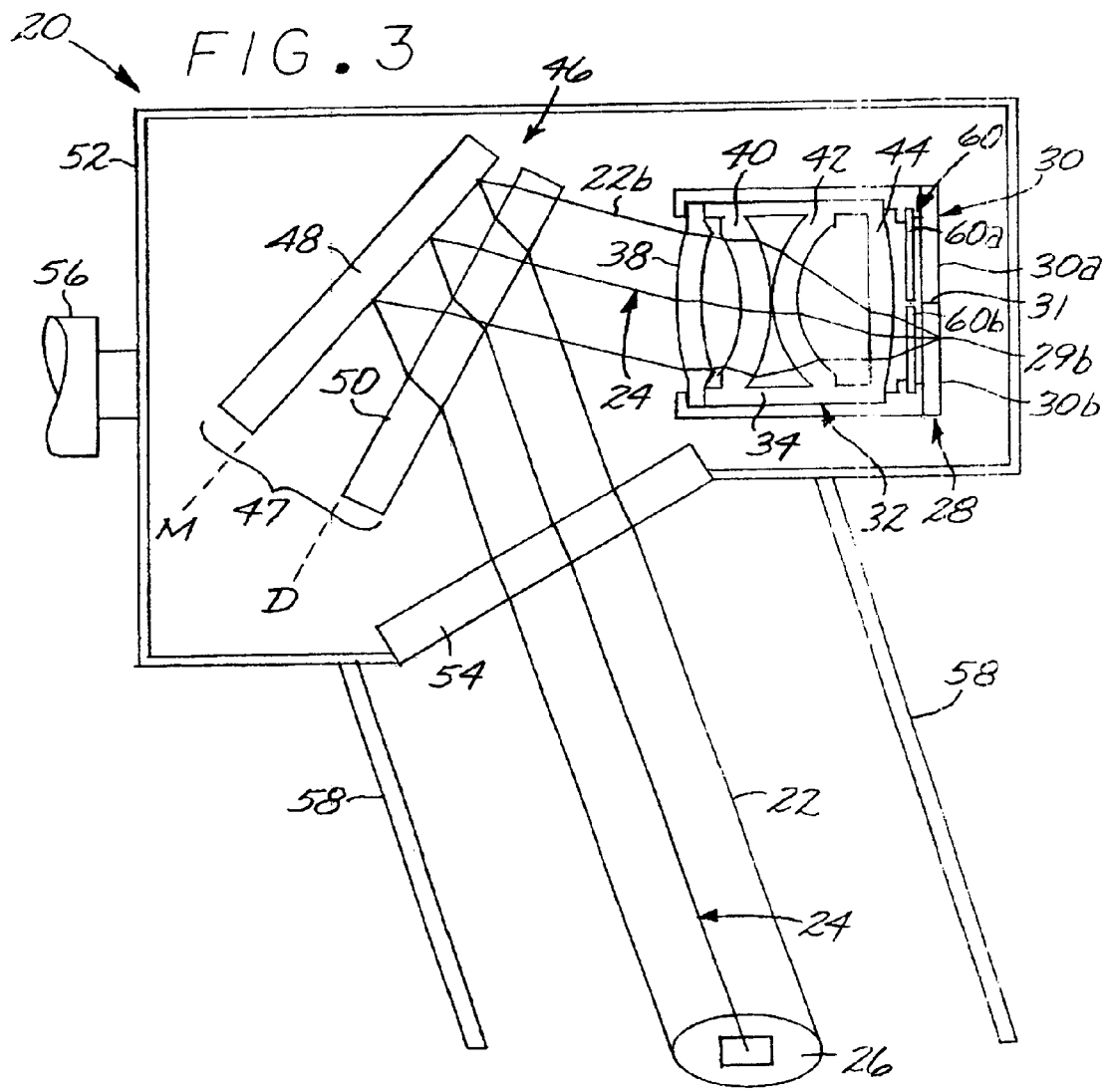
FIG. 3 is a schematic ray path drawing like that of FIG. 2, but for a second spectral band of the light beam.

FIGS. 1-3 schematically depict an imaging sensor system 20 that images a light beam 22 traveling in two (or more) different spectral bands $\lambda 1$ and $\lambda 2$ on a light path 24 from a target 26. The "spectral bands" $\lambda 1$ and $\lambda 2$ may each refer to a single discrete wavelength or to a range of wavelengths, and there may be other wavelengths present in the light beam 22 as well. The spectral bands $\lambda 1$ and $\lambda 2$ may be in any range, such as the ultraviolet, visible, or infrared, but are preferably in the infrared for the applications of most interest.

The sensor system 20 includes an imaging sensor 28 operable to image respective light subbeams 22a and 22b of the respective different spectral bands $\lambda 1$ and $\lambda 2$. The imaging sensor 28 preferably includes at least one focal plane array 30, and preferably exactly one focal plane array 30. If exactly one focal plane array 30 is used, that focal plane array 30 must be capable of imaging light of both spectral bands $\lambda 1$, and $\lambda 2$. The use of exactly one focal plane array 30 is preferred for use as a common imaging sensor, as it is not necessary to calibrate two different focal plane arrays which may have different performance characteristics. In this case, the respective light subbeams 22a and 22b of spectral bands $\lambda 1$ and $\lambda 2$ are imaged as respective images 29a and 29b onto respective different focal plane array parts 30a and 30b of the common imaging sensor 28, as shown schematically in FIG. 1. The two images may be immediately adjacent, or there may be a non-imaging stripe 31 separating the two images 29a and 29b to ensure that there is no overlap of the images 29a and 29b.

The imaging sensor system 20 further includes a common optics 32 having at least one powered reflective or refractive optical element 34, indicated schematically as a single lens 36 in FIG. 1 and as a practical set of four lenses 38, 40, 42, 44 in FIGS. 2 and 3. The common optics 32 may include any operable combination of reflective and/or refractive optical elements 34 that image the light beam 22 from the target 26 onto the imaging sensor 28. In the embodiments of FIGS. 2-3, the common optics 32 is integrated with the imaging sensor 28 into a single unit. (FIGS. 2-3 respectively illustrate the beam paths of the two spectral bands $\lambda 1$ and $\lambda 2$ for a single physical embodiment of the structure.)

By "common optics" is meant that a respective light subbeam 22a and 22b of each of the two different spectral bands $\lambda 1$ and $\lambda 2$ from the target 26 reaching the imaging sensor 28 encounter, that is, either reflect from (in the case of reflective optical elements 34) or are refracted by (in the case of refractive optical elements 34, as illustrated), each optical element 34 of the common optics 32. As seen in FIGS. 1-3, the light subbeams 22a and 22b need not, and typically do not, encounter exactly the same locations of the optical elements 34 of the common optics 32 in each case, but they do encounter each of the optical elements 34. Consequently, it is not necessary to align initially, and to maintain in alignment during service, two different sets of optical elements.

A wavelength-selective beamsplitter 46 is disposed on the light path 24 between the target 26 and the imaging sensor 28. In the illustrated preferred embodiment, the wavelength-selective beamsplitter 46 lies on the light path 24 between the target 26 and the common optics 32, but it could, for example, lie between the common optics 32 and the imaging sensor 28, or between elements of the common optics 32. The wavelength-selective beamsplitter 46 splits the light beam 22 into the two light subbeams 22a and 22b that are incident upon two different locations of the imaging sensor 28.

The wavelength-selective beamsplitter 46 preferably comprises a dichroic reflector 47 having a mirror 48 and a wavelength-selective dichroic element 50, arranged so that the light path 24 from the target 26 encounters the wavelength-selective dichroic element 50 before it encounters the mirror 48. Dichroic elements 50 are known for other applications, and are typically fabricated by depositing a stack of thin layers on a transparent substrate. The dichroic element 50 reflects light of a first spectral band and passes light of a second spectral band. The mirror 48 is preferably a planar mirror having a mirror plane M, and the wavelength-selective dichroic element 50 is planar having a dichroic plane D. The mirror plane M is not parallel to the dichroic plane P, as seen in FIGS. 1-3.

FIGS. 2-3 illustrate the operation of the preferred wavelength-selective beamsplitter 46 using the dichroic reflector 47. The common light beam 22, including light of both spectral bands $\lambda 1$ and $\lambda 2$, encounters the dichroic reflector 47. As best seen in FIG. 2, the light of spectral band $\lambda 1$ reflects from the dichroic element 50. The light subbeam 22a of spectral band $\lambda 1$ is focused by the common optics 32 onto the imaging sensor 28 as the first image 29a. As best seen in FIG. 3, the light subbeam 22b of spectral band $\lambda 2$ passes through the dichroic element 50, is reflected from the mirror 48, and again passes through the dichroic element 50. Because the mirror plane M is not parallel to the dichroic plane P, there is a resulting spatial separation of the light subbeam 22b from the light subbeam 22a. The light subbeam 22b is focused by the common optics 32 onto the imaging sensor 28 as the second image 29b, which is spatially separated from the first image 29a.

The angles of the mirror 48 and the dichroic element 50 may be altered so that the first light subbeam 22a is reflected to another area, such as the lower part of the imaging sensor 28 in the view of FIG. 2, and the second light subbeam 22b is reflected to another area, such as the upper part of the imaging sensor 28 in the view of FIG. 3.

The imaging sensor 28, the common optics 32, and the wavelength-selective beamsplitter 46 are preferably packaged in the interior of a housing 52 (FIGS. 2-3). The housing 52 protects these components from the external environment, and also provides a convenient structure to hold the components in the proper positions and orientations. To transmit the light beam 22 into the interior of the housing 52, a sensor window 54 is positioned such that the light path 24 passes through the sensor window 54 before it encounters the wavelength-selective beamsplitter 46, the common optics 32, and the imaging sensor 28. There may additionally be a mount 56 that supports the housing 52 (where used), the imaging sensor 28, the common optics 32, and the wavelength-selective beamsplitter 46 in an orientation of interest for the particular application. In the illustrated embodiment of FIGS. 2-3, the mount 56 is affixed to the housing 52 and may be selectively adjusted to point the imaging sensor system 20 at any target 26 of interest. For the application of most current interest as described in the Background, the detection of buried explosive mines, the mount 56 is structured to point the imaging sensor system 20 at targets 26 that are on or in the ground. That is, the target 26 in this application is typically soil, and particularly the disturbed soil that is above a buried explosive mine.

The presence of the two reflective elements, the mirror 48 and the dichroic element 50, raises the possibility of ghost images reaching the imaging sensor 28. That is, referring to the embodiment of FIGS. 2-3, some light of spectral band $\lambda 2$ (or other wavelengths) could be reflected to the location of the first image 29a, and/or some light of spectral band $\lambda 1$ (or other wavelengths) could be reflected to the location of the second image 29b, in each case possibly causing incorrect interpretations of the images. To minimize such ghost images, a light baffle 58 may be positioned such that any light paths that may cause ghost images are physically blocked from reaching the imaging sensor 28. The light baffle 58 may be inside or outside of the housing 52. FIGS. 2-3 illustrate light baffles 58 positioned exterior to the housing 52 so that the stray light paths encounter the light baffles 58 before they pass through the sensor window 54. The housing 52 and the internal structure within the housing 52 may also serve as baffles to block stray light paths.

To further reduce the stray light, a spectral filter 60 including individual spectral filters 60a and 60b is preferably placed in front of the imaging sensor 28, so that the spectral filter 60 lies between the target 26 and the imaging sensor 28, and most preferably so that the spectral filter 60 lies between the dichroic reflector 47 and the imaging sensor 28. The spectral filter 60 intercepts the light beam 22 before it reaches the imaging sensor 28. The spectral filters 60a and 60b are selected to pass only the respective spectral bands $\lambda 1$ and $\lambda 2$, and not pass other wavelengths that might be present in any stray light.

Figure 4:
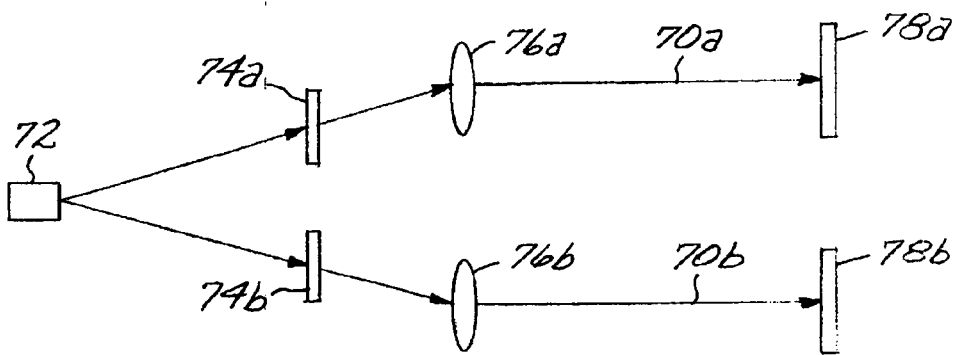
FIG. 4 is a schematic ray path drawing for two different light spectral bands of a prior art sensor system that is not within the scope of the present approach.

FIG. 4 illustrates a prior art approach that is not within the scope of the present invention. Light beams 70a and 70b from a target 72 pass through filters 74a and 74b to achieve wavelength separation, through separate optics 76a and 76b, and thence to separate imaging sensors 78a and 78b. Each of the light beams 70a and 70b do not encounter each optical element of the separate optics 76a and 76b. The approach of FIG. 4 requires that the separate optics 76a and 76b be aligned and maintained in alignment with their respective imaging sensors 78a and 78b, and that the imaging sensors 78a and 78b be calibrated and maintained in calibration with each other.

The application of the imaging sensor system 20 of most current interest is the detection of explosive mines that are buried in the ground. In this application, the imaging sensor system 20 as described herein is aimed toward the ground such that the target 26 is on or in the ground, and the images 29a and 29b produced by the two subbeams 22a and 22b of respective spectral bands $\lambda 1$ and $\lambda 2$ on the imaging sensor 28 are analyzed.

The present approach has been reduced to practice. The prototype performs in the manner discussed herein.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An imaging sensor system that images in two different spectral bands a light beam traveling on a light path from a target, the sensor system comprising:
   an imaging sensor operable to image light of the two different spectral bands;
   a common optics having at least one reflective or refractive optical element, wherein the light beam of each of the two different spectral bands from the target reaching the imaging sensor encounters each optical element of the common optics; and
   a wavelength-selective beamsplitter on the light path between the target and the imaging sensor, wherein the wavelength-selective beamsplitter splits the light beam into two subbeams, one subbeam for each of the two different spectral bands, that are respectively incident upon two different locations of the imaging sensor, and wherein the wavelength-selective beamsplitter comprises a planar mirror having a mirror plane and a planar wavelength-selective dichroic element having a dichroic plane, and wherein the mirror plane is not parallel to the dichroic plane.

2. The sensor system of claim 1, wherein the imaging sensor is a single common imaging sensor that images the light of the two different spectral bands.

3. The sensor system of claim 1, wherein the wavelength-selective beamsplitter comprises a mirror and a wavelength-selective dichroic element.

4. The sensor system of claim 1, wherein the wavelength-selective beamsplitter lies on the light path between the target and the common optics.

5. The sensor system of claim 1, further including
   a spectral filter that intercepts the light beam before it reaches the imaging sensor.

6. The sensor system of claim 1, further including
   a sensor window positioned such that the light path passes through the sensor window before it encounters the wavelength-selective beamsplitter, the common optics, and the imaging sensor.

7. The sensor system of claim 1, further including
   a sensor window positioned such that the light path passes through the sensor window before it encounters the wavelength-selective beamsplitter, the common optics, and the imaging sensor, and a light baffle positioned such that the light path encounters the light baffle before it passes through the sensor window.

8. The sensor system of claim 1, further including a mount that supports the imaging sensor, the common optics, and the wavelength-selective beamsplitter.

9. The sensor system of claim 1, further including a mount that supports the imaging sensor, the common optics, and the wavelength-selective beamsplitter in an orientation so that the target is on or in the ground.

10. An imaging sensor system that images in two different infrared spectral bands an infrared light beam traveling on a light path from a target, the sensor system comprising:
an infrared imaging sensor operable to image light of the two different infrared spectral bands, wherein the imaging sensor is a single common imaging sensor that images the light of the two different spectral bands;
a common optics having at least one reflective or refractive optical element, wherein the infrared light beam of the two different infrared spectral bands from the target reaching the imaging sensor encounters each optical element of the common optics;
a wavelength-selective dichroic reflector on the light path between the target and the imaging sensor, wherein the dichroic reflector splits the infrared light beam into two subbeams, one subbeam for each of the two different infrared spectral bands, that are respectively incident upon two different locations of the image sensor, wherein the wavelength-selective beamsplitter comprises a planar mirror having a mirror plane and a planar wavelength-selective dichroic element having a dichroic plane, and wherein the mirror plane is not parallel to the dichroic plane; and
a sensor window positioned such that the infrared light path passes through the sensor window before it encounters the dichroic reflector, the common optics, and the imaging sensor.

11. The sensor system of claim 10, wherein the dichroic reflector comprises a planar mirror having a mirror plane and a planar dichroic element having a dichroic plane, and wherein the mirror plane is not parallel to the dichroic plane.

12. The sensor system of claim 10, wherein the dichroic reflector lies on the light path between the target and the common optics.

13. The sensor system of claim 10, further including a light baffle positioned such that the light path encounters the light baffle before it passes through the sensor window.

14. The sensor system of claim 10, further including a mount that supports the imaging sensor, the common optics, and the wavelength-selective beamsplitter.

15. The sensor system of claim 10, further including a mount that supports the imaging sensor, the common optics, and the wavelength-selective beamsplitter in an orientation so that the target is on or in the ground.

16. The sensor system of claim 10, further including a spectral filter between the dichroic reflector and the imaging sensor.

17. A method for detecting explosive mines that are on or in the ground, comprising the steps of
providing an imaging sensor system that images in two different spectral bands a light beam traveling on a light path from a target, the sensor system comprising:
an imaging sensor operable to image light of the two different spectral bands,
a common optics having at least one reflective or refractive optical element, wherein the light beam of the two different spectral bands from the target reaching the imaging sensor encounters each optical element of the common optics, and
a wavelength-selective beamsplitter on the light path between the target and the imaging sensor, wherein the wavelength-selective beamsplitter splits the light beam into two subbeams, one subbeam for each of the two different spectral bands, that are respectively incident upon two different locations of the image sensor, wherein the wavelength-selective beamsplitter comprises a planar mirror having a mirror plane and a planar wavelength-selective dichroic element having a dichroic plane, and wherein the mirror plane is not parallel to the dichroic plane;
aiming the imaging sensor system toward the ground such that the target is on or in the ground; and
analyzing images produced by the two subbeams on the imaging sensor.

18. The method of claim 17, wherein the step of analyzing images includes the step of
analyzing the images to detect the explosive mines that are on or in the ground.

19. The method of claim 17, wherein the step of analyzing images includes the step of
analyzing the images to detect the explosive mines that are on or in the ground based upon thermal emissivity differences of disturbed and undisturbed soils.

20. The method of claim 17, wherein the step of aiming includes the step of
aiming the imaging sensor system toward an explosive mines that is on or in the ground.

* * * * *